Feb. 6, 1968 A. E. BECKERS 3,368,094
DISPLAY TARGET WITH DISCRETE PHOSPHOR DOTS ON CONTINUOUS
PHOSPHOR LAYER FOR STORAGE TUBE
Filed Oct. 22, 1965 2 Sheets-Sheet 1

INVENTORS.
ALBERT E. BECKERS,
BY
ATTORNEY

INVENTOR
ALBERT E. BECKERS,
BY
W H Mac Allister Jr
ATTORNEY.

United States Patent Office 3,368,094
Patented Feb. 6, 1968

3,368,094
DISPLAY TARGET WITH DISCRETE PHOSPHOR DOTS ON CONTINUOUS PHOSPHOR LAYER FOR STORAGE TUBE
Albert Eberhard Beckers, Oceanside, Calif., assignor to Hughes Aircraft Company, Culver City, Calif., a corporation of Delaware
Filed Oct. 22, 1965, Ser. No. 501,190
1 Claim. (Cl. 313—68)

ABSTRACT OF THE DISCLOSURE

A color viewing screen especially for storage display tubes and having a continuous layer of one color phosphor on which is disposed a plurality of discrete spaced phosphor elements of a different color.

This invention relates to a direct-view half-tone type color storage tube. More particularly, the invention relates to a novel phosphor target or screen adapted to present a display wherein signals of different intensities representing different kinds of target information such as moving or static targets appear in different colors.

Color storage tubes are of particular interest in systems where it is desired to provide a visual display which discriminates between signals representing different kinds of information. Thus, in certain types of radar systems, it is often desirable to visually distinguish displays of targets moving at different speeds, for example. In other radar systems such as for navigation, it is desirable to visually distinguish moving vehicles or aircraft, for example, from the background or terrain.

In U.S. Patent No. 2,962,623 issued to C. D. Beintema and assigned to the instant assignee, a color storage tube for these purposes is disclosed wherein a phosphor screen is utilized which comprises a plurality of phosphor elements which are in the form of dots surrounded by rings of phosphor material, the phosphor materials comprising the dots and rings being different whereby the dots emit light of one primary color and the rings light of a different primary color. By expanding or contracting the diameter of an electron beam coming through a storage grid aperture aligned with the dot, luminescence from the dot or from the dot and the ring can be obtained, thus providing a range of color from the primary color of the dot to mixtures of this primary color with the primary color of the ring.

In a co-pending application, S.N. 221,254 filed Sept. 4, 1962, entitled, "Color Display Direct-View Half-Tone Storage Tube," by L. S. Yaggy and C. D. Beintema, now Patent No. 3,240,974, assigned to the instant assignee, another type of viewing target is described wherein a first set of substantially square phosphor areas capable of emitting light of one color and a second set of substantially square phosphor areas capable of emitting light of a different color are disposed around the periphery of the phosphor areas of the first set and are tangent thereto at a single point thereof with no phosphor areas of the same color touching each other. By this arrangement, adjacent phosphor areas of one color "share" intervening phosphor areas of the different color for color-mixing purposes, thus making it possible to provide more phosphor areas per unit space than by the aforementioned ring-dot configuration, hence providing a display of enhanced resolution.

It will be appreciated, however, that in both of the aforementioned types of viewing targets it is necessary that very large numbers of different color-emitting phosphor areas must be formed closely adjacent to each other. Such phosphor geometry therefore imposes highly sensitive and expensive fabrication procedures upon the manufacture of such targets and the tubes employing them. Thus, resort to highly critical marking and photographic techniques is necessary in order to produce a viewing target having the proper and precise arrangement of different color-emitting phosphor areas.

It is therefore an object of the present invention to provide an improved half-tone color storage display tube.

Another object of the invention is to provide an improved half-tone color storage display tube having uniformity of color and brightness and better controlability of the transition from one color to another.

Still another object of the invention is to provide an improved half-tone color storage display tube of enhanced resolution.

Another object of the invention is to provide an improved phosphor viewing target for color cathode ray tubes.

The invention will be described in greater detail by reference to the drawings in which.

Figure 1:
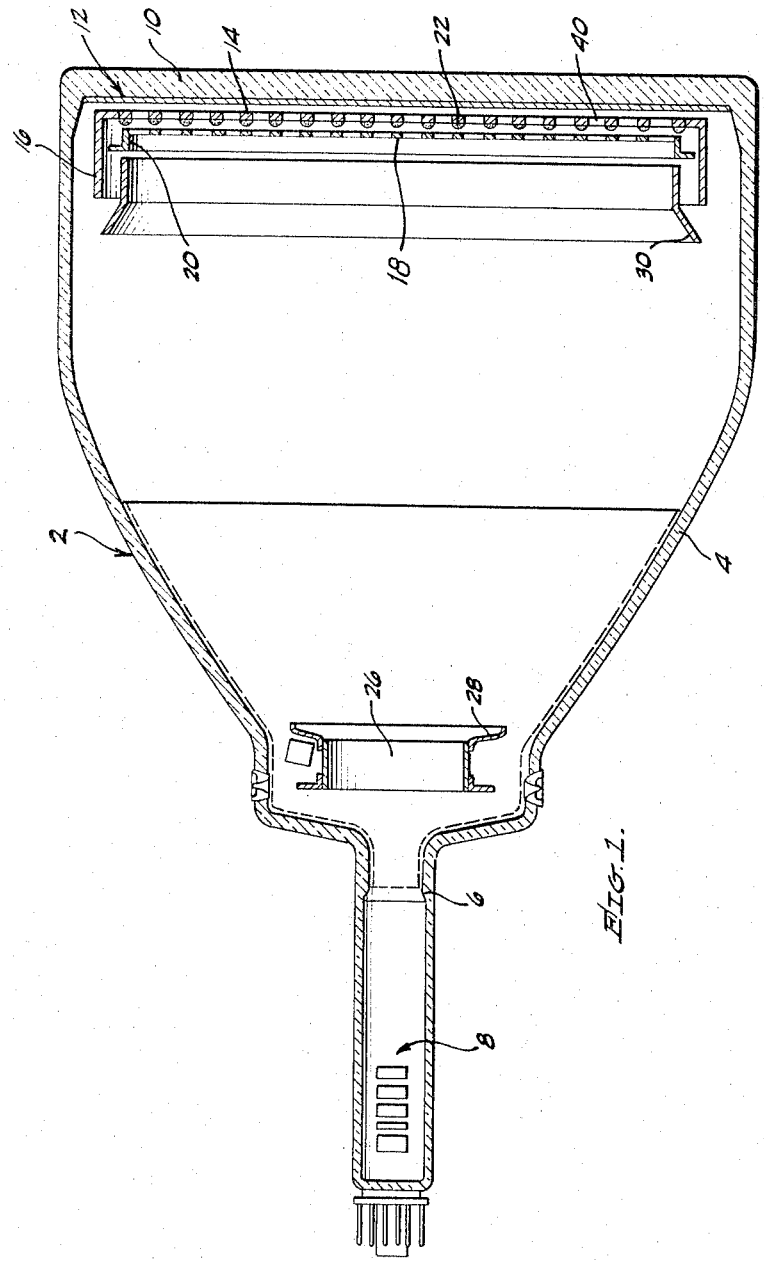
FIGURE 1 shows a cross-sectional schematic view of a storage cathode ray tube embodying the invention.

Referring now to the drawings, FIGURE 1 shows a direct-viewing color storage tube comprising an evacuated envelope 2 which includes a large bulbous section 4 having an axially aligned neck portion 6 for housing an electron gun 8 for producing a scanning electron beam of elemental cross-sectional area. Means for orthogonally deflecting the electron beam may be either electromagnetic or electrostatic as is well known in the art and, while not shown, may comprise a deflecting coil disposed externally around the neck portion 6 or deflecting plates disposed internally in the neck portion.

The end of the bulbous section 4 is provided with a faceplate 10 on the interior surface of which is disposed a phosphor viewing screen 12 which will be described in greater detail hereinafter. Adjacent to and co-extensive with the viewing screen 12 there is provided a storage screen 14, supported about its periphery by a ring 16, and a collector grid 18 similarly supported about its periphery by a ring 20.

The storage screen 14 may comprise an electro-formed nickel mesh, for example, of the order of ½ mil thick. The storage screen 14 has a plurality of apertures which may be about 2 mils square, for example. The screen 14 is so formed and positioned in its support ring 16 that the apertures are in proper alignment with the phosphor areas of the viewing screen as will be more fully explained hereinafter. A storage surface is provided by a layer 22 of dielectric material disposed over the metallic grid portions of the screen on the side thereof opposite the viewing screen 12. The dielectric layer 22 may comprise, for example, a layer of magnesium fluoride of the order of 3 microns thick evaporated on the storage target screen 14.

The collector grid 18 may be provided by either a woven or electro-formed mesh having a pitch of about 250 meshes per inch. This grid is adapted to be maintained at a positive potential with respect to the storage screen 14 for the purpose of collecting secondary electrons emitted from the dielectric layer 22 upon impingement thereof by an electron beam. This potential may be of the order of 120 volts positive with respect to ground.

A source of flood electrons comprises a ring flood gun 26 disposed concentrically about the longitudinal axis of the tube envelope 2. Flood electrons are diffused and collimated over the area of the storage screen by means of the annular electrode portion 28 of the flood gun and an annular funnel-shaped electrode 30 disposed about the periphery of the collector grid 18 and extending toward the flood gun 26 a distance which is a function of the diameter of the tube. The electrode portion 28 of the flood gun and the funnel-shaped electrode 30 are maintained at a potential that is slightly negative with respect to the potential of the collector grid 18 and may be of the order of 100 volts positive with respect to ground. Additional collimating electrodes, not shown, are provided in the form of annular bands of conductive material applied to the inside surface of the bulbous section 4.

Figure 2:
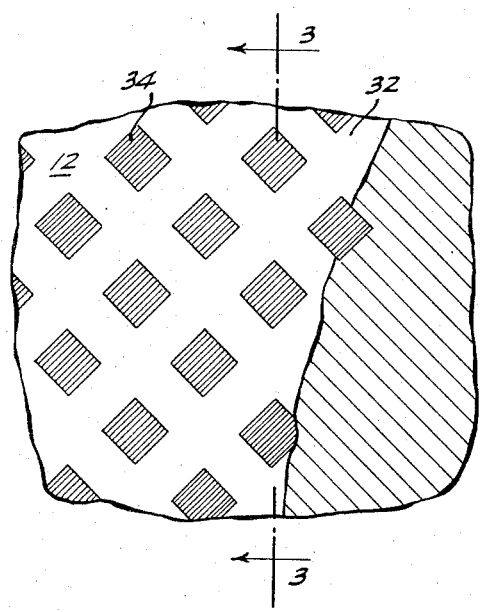
FIGURE 2 shows an enlarged view of a viewing or phosphor screen for use in a storage cathode ray tube according to the invention.
Figure 3:
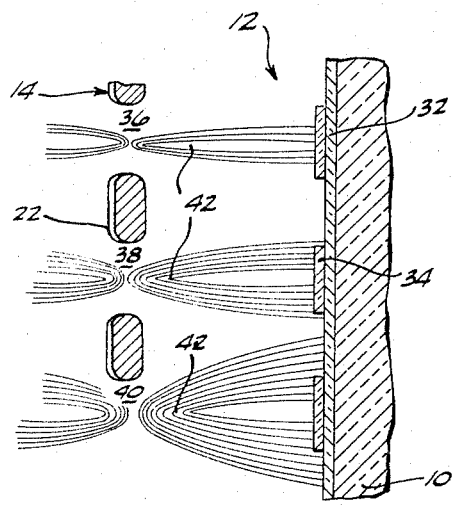
FIGURE 3 shows an enlarged view of a storage target or mesh in combination and alignment with a viewing screen for use in a storage cathode ray tube according to the invention.

Referring now to FIGURES 2 and 3, an enlarged portion of the viewing screen 12 is shown. According to the present invention, the viewing screen 12 comprises a plurality of phosphor areas 32 and 34. Phosphor areas 32 are formed or constituted by a single layer of phosphor material capable of emitting a single color of light such as green, for example; phosphor areas 34 are likewise constituted of a phosphor capable of emitting a single color of light different to that emitted by the phosphor layer 32, such as red, for example. As shown, the red phosphor areas 34 are deposited on the continuous green phosphor layer 32. Each red phosphor area 34 thus is not only surrounded by green phosphor areas 32 but also overlies portions of the green phosphor layer 32. The storage screen 14 is mounted in the tube so that the apertures 40 are coaxially aligned with respect to only phosphor areas of a single color which may be the less-efficient light-emitting phosphor; thus, for example, only the red phosphor areas 34 may be aligned with the storage screen apertures 40 and are exposed therethrough. It is possible to utilize other arrangements of the storage screen and the viewing screen without departing from the spirit of the invention provided each phosphor area of one color has a plurality of phosphor areas of a different color disposed around the periphery thereof such that an expanding beam of electrons advances onto the second phosphor in certain directions from the first phosphor before it does in other directions and provided the storage screen is disposed so as to expose only phosphor areas of the same color to a beam of electrons of small cross section coming through the apertures thereof.

The color storage tube of the present invention may be operated in the fashion described in the aforementioned patent to C. D. Beintema. In general, a uniform collimated flow of low velocity flood electrons is applied over the entire storage area of the storage screen 14. The storage surface is prepared for writing by applying a 5 to 10 volt positive pulse to the screen portion which will raise the potential of the storage surface by an amount corresponding to the amplitude of the pulse. The flood electrons then charge the storage surface towards ground potential which may also be the potential of the flood gun cathode. The potentials of the storage surface follow the negative excursion of the trailing edge of the pulse whereby the storage surface eventually assumes a quiescent potential of from 5 to 10 volts negative with respect to ground.

Writing or storage is accomplished by scanning the storage surface with a high energy, high current density electron beam produced by the electron gun 8 and current-modulated in accordance with suitable information signals. This scanning charges the storage surface towards the mean potential of the flood gun cathode or ground by an amount which is a function of the input modulating signal. The potential of the area of storage surface surrounding a given aperture controls the flow of flood electrons through that aperture and thus controls the brightness of illumination of the corresponding phosphor area in a manner hereinafter explained.

Referring to FIGURE 3, if the storage surface about a specific aperture 36 of the storage screen 14 is charged in the range of from $-5$ to $-3.5$ volts with respect to the flood gun cathode, the flood electrons designated generally by reference numeral 42 are just able to pass through the aperture 36 and only the phosphor area 34 will be excited to emit red light, for example, through the underlying phosphor layer 32. The thickness of the phosphor areas 34 is such so as to permit the flood electrons to excite the phosphor areas 34 without penetration therethrough to excite the underlying phosphor layer 32 which in turn is thin enough to permit the emitted red light to be observed through the faceplate 10 of the tube. Typically satisfactory thicknesses for the phosphor areas to achieve such operation are a few microns for the continuous phosphor layer 32 and about 10 microns for the phosphor areas 34. The effect of the charge surrounding the aperture 36 is an electron lens effect which focuses the flood electrons on the phosphor area 34 which is in alignment with this aperture. If the storage surface surrounding an aperture such as the aperture 38, for example, is charged in the range of from $-3.5$ to $-1.5$ volts relative to the flood gun cathode, the lens effect produced around the aperture permits the flood electrons to penetrate through the aperture in such a manner as to impinge not only on the phosphor area 34 which is aligned with the aperture but also on portions of the phosphor areas 32 which are disposed around the phosphor area 34 as described previously. Thus, phospor area 34 may be energized to produce red light and controllably selected portions of the adjacent phosphor areas 32 may also be energized to produce green light. The resulting combination of red and green light produces light which appears yellow to the eye. The flood electrons passing through the apertures may thus be controlled and focused so as to form a spot whose diameter may be restricted or expanded to impinge only on phosphor areas of a single color or on different phosphor areas capable of producing a different color.

So far, storage surface charge conditions have been described which will produce light from a first color phosphor area or a mixture of light from phosphor areas of a second color. By expanding the flood beam spot even more, the second color light can be produced so as to override the first color light whereby only the second color light is observed. In order to do this, the phosphor areas producing the second color light should be more efficient than the phosphor areas producing the first color light. This condition is realized by utilizing phosphor materials capable of producing green and red colors, for example, the green phosphor being more efficient than the red. Hence, as described previously, the red phosphor areas such as the areas 34 are disposed in alignment with the apertures in the storage screen and the more efficient green phosphor areas constituted by the underlying phosphor layer 32 are disposed about the red phosphor areas 34 and the green phosphor portions are gradually introduced to the action of the flood electrons. To achieve predominance of the green light, the storage surface surrounding a specific aperture such as 40 is charged to a potential which is from $-1.5$ to 0 volts with respect to the flood gun cathode. The resulting lens action at the aperture permits a flood beam spot of maximum diameter to fall on the red phosphor area 34 as well as on substantial portions of the adjacent green phosphor areas 32 as shown in FIGURE 3.

It is thus apparent that as the storage surface surrounding the apertures in the storage screen is charged in a positive direction from $-5$ to 0 volts relative to the flood gun cathode potential, the colors produced by the flood electrons on the viewing screen range in a spectrum from red to green including mixtures thereof.

There thus has been described a cathode ray color storage tube having more uniformity of color and brightness and better controllability of the transition from one color to another. Also by the present arrangement of the phosphor areas on the viewing screen more phosphor areas can be provided thereon than by the ring-dot configuration of the prior art which results in a display of enhanced resolution.

What is claimed is:

1. A direct-view storage tube comprising a storage target, means for producing a charge pattern on said storage target, means for directing flood electrons uniformly over said storage target, a viewing screen adjacent said storage target comprising a continuous layer of phosphor material having a thickness on the order of a few microns capable of emitting light of a first color, and a plurality of discrete spaced phosphor elements having a thickness on the order of ten microns capable of emitting light of a second color disposed on said phosphor layer, the efficiency of the phosphor material constituting said continuous layer thereof being greater than the efficiency of the phosphor material constituting said discrete elements thereof, the thickness of said discrete phosphor elements being such as to prevent excitation of the underlying continuous layer.

References Cited

UNITED STATES PATENTS

| 2,962,623 | 11/1960 | Beintema | 313—92 |
| 3,146,369 | 8/1964 | Kaplan | 313—92 |
| 3,122,670 | 2/1964 | Rudatis | 313—92 |
| 3,240,974 | 3/1966 | Yaggy et al. | 313—68 |

ROBERT SEGAL, *Primary Examiner.*